United States Patent
Kessel et al.

(10) Patent No.: US 8,370,216 B2
(45) Date of Patent: Feb. 5, 2013

(54) PERSONALIZED PRELOADING OF DIGITAL CONTENT

(75) Inventors: Steven Kessel, Seattle, WA (US); Bill Carr, Seattle, WA (US); Samuel Heyworth, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 2659 days.

(21) Appl. No.: 11/113,449

(22) Filed: Apr. 22, 2005

(65) Prior Publication Data

US 2006/0200413 A1  Sep. 7, 2006

Related U.S. Application Data

(60) Provisional application No. 60/658,937, filed on Mar. 4, 2005.

(51) Int. Cl.
 *G06Q 30/00* (2012.01)
(52) U.S. Cl. ........... 705/26.7; 705/26.5; 705/50; 705/57
(58) Field of Classification Search ................. 705/26.5, 705/26.7, 50, 57
See application file for complete search history.

(56) References Cited

U.S. PATENT DOCUMENTS

| | | | |
|---|---|---|---|
| 5,557,541 A | 9/1996 | Schulhof et al. | |
| 6,192,340 B1 | 2/2001 | Abecassis | |
| 6,714,937 B1 * | 3/2004 | Eynon et al. ................. | 705/26.5 |
| 6,745,239 B1 * | 6/2004 | Hubbard ....................... | 709/220 |
| 2004/0107169 A1 | 6/2004 | Lowe | |
| 2004/0158712 A1 | 8/2004 | Lee et al. | |
| 2005/0091107 A1 * | 4/2005 | Blum .............................. | 705/14 |
| 2005/0144091 A1 * | 6/2005 | Harper et al. ................... | 705/26 |

FOREIGN PATENT DOCUMENTS

| | | |
|---|---|---|
| JP | 2001-175946 | 6/2001 |
| JP | 2002-024570 A | 1/2002 |
| JP | 2002-041059 | 2/2002 |
| JP | 2002-082977 | 3/2002 |
| JP | 2003-195864 | 7/2003 |
| JP | 2003-288527 A | 10/2003 |
| JP | 2003-303248 | 10/2003 |
| JP | 2003-323515 | 11/2003 |
| JP | 2003-533750 | 11/2003 |

(Continued)

OTHER PUBLICATIONS

Apple-iTunes-Store, http://web.archive.org/web/20040202103547/www.apple.com/itunes/store/, 3 pages.*

(Continued)

*Primary Examiner* — James D Nigh
(74) *Attorney, Agent, or Firm* — Seed IP Law Group PLLC (57) ABSTRACT

Techniques are described regarding providing consumers with devices on which digital content appropriate for those consumers has been loaded, such as digital media player devices or other consumer devices that are able to play or otherwise present digital media loaded on those devices. In some situations, when a consumer orders such a digital media player or other consumer device from a merchant (or other distributor of the device), the merchant preloads a copy of the device with digital media content before delivering that device to the consumer or other specified recipient, such as digital media items that are automatically selected in a personalized manner for the recipient to whom the device will be sent. This abstract is provided to comply with rules requiring an abstract, and is submitted with the intention that it will not be used to interpret or limit the scope or meaning of the claims.

30 Claims, 2 Drawing Sheets

FOREIGN PATENT DOCUMENTS

JP 2005-025365 A 1/2005

OTHER PUBLICATIONS

Napster—terms, http://web.archive.org/web/20040405153036/www.napster.com/terms.html (1 of 8)May 29, 2009 10:57:37 AM, 8 pages.*

Napster | Membership Service Preview, http://web.archive.org/web/20011130122914/www.napster.com/preview/howitworks.html, 2 pages.*

Napster.com, http://web.archive.org/web/20040207143455/http://www.napster.com, 1 page.*

Apple—iTunes—Music Store, The #I music download store. http://www.apple.com/iTunes/store, 2 pages.*

Napster terms (http://web.archive.org/web/20040405153036/www.napster.com/terms.html, 8 pages).*

Apple-iTunes-Store (http://web.archive.org/web/20040202103547/www.apple.com/itunes/store/, 3 pages).*

"Connect With the Future of Medicine Today!," Handheldmed®, retrieved Feb. 24, 2005, from http://www.handheldmed.com/, 2 pages.

"Digital Juke Boxes," ADEC, retrieved Feb. 24, 2005, from http://www.adecmusic.com/adecshop/full_size_jukeboxes.htm, 3 pages.

"HP and Apple Partner to Deliver Digital Music Player and iTunes to HP Customers," Apple Computer, Inc., retrieved Feb. 24, 2005, from http://www.apple.com/pr/library/2004/jan/08hp.html, 3 pages.

"IRiver IFP-790T MP3 Player," Tweeter, retrieved Feb. 24, 2005, from http://www.tweeter.com/sm-iriver-ifp-790t-mp3-player--pi-1876379.html, 1 page.

"Jukebox C," Neversoft, retrieved Feb. 17, 2006, from http://neversoft.com.au/nomadc.htm, 2 pages.

"Ministry Bundles Album with MP3 Player," Tech Digest, Nov. 3, 2003, retrieved Feb. 24, 2005, from http://techdigestik.typepad.com/tech_digest/2003/11/ministry_bundle.html, 2 pages.

"Napster to Go Launches," Engadget, Feb. 3, 2005, retrieved Feb. 24, 2005, from http://www.engadget.com/entry/1234000567030228, 19 pages.

"Napster to Go," Napster, retrieved Feb. 24, 2005, from http://www.napster.com/ntg.html, 2 pages.

"PalmOne MP3 Audio Kit," Ascént, retrieved Feb. 24, 2005, from http://www.ascent.co.nz/mn-product-spec.asp?pid=222221, 2 pages.

"Portable Music," Hypebot, retrieved Feb. 24, 2005, from http://hypebot.ypepad.com/hypebot/portable_music/, 47 pages.

"Preloaded iPods," MacSlash, retrieved Feb. 24, 2005, from http://macslash.org/article.pl?sid=04/01/13/0841239, 5 pages.

"The #1 Music Download Store," Apple Computer, Inc., retrieved Feb. 24, 2005, from http://www.apple.com/itunes/store/ 2 pages.

"TomTom TomTom GO (maps preloaded)," Vann's, retrieved Feb. 24, 2005, from http://www.vans.com/shop/servlet/item/features/405026789, 2 pages.

"UNCW Launches First Multi-Campus Peer-to-Peer File Sharing Initiative—UNCW One of Four Test Sites," UNCW News, Oct. 14, 2004, retrieved Feb. 24, 2005, from http://appserv02.uncw.edu/news/article.asp?ID=1386, 3 pages.

"Virgin Player Review," MP3 Player Blog, Jan. 5, 2005, retrieved Feb. 24, 2005, from http://www.playerblog.com/archives/000481.shtml, 2 pages.

"www.AudioBooksForFree.com Entrypoint," retrieved Feb. 24, 2005, from http://www.audiobooksforfree.com/, 1 page.

Bishop, T., "Microsoft Notebook: Making Music Subscriptions Portable," Seattlepi.com, May 3, 2004, retrieved Feb. 24, 2005, from http://seattlepi.nwsource.com/business/171589_msftnotebook03.html, 3 pages.

Cassavoy, L., "Listen.com Adds CD Burning to Service—Rhapsody Subscription Service Now Lets Users Transfer Some Tracks to Disc—For a Price," PC World Oct. 25, 2002, retrieved Feb. 17, 2006, from http://www.pcworld.com/news/article/0,aid,106380,00.asp, 4 pages.

Lasky, M., "100-Plus Hours of Digital Music on the Go—The nomad jukebox has robust features and large storage capacity," PC World, Nov. 2000, retrieved Feb. 17, 2006, from http://www.pcworld.com/reviews/article.asp?aid=18591 , 3 pages.

Naraine, R., "Windows Media Player on the Fly with 'Janus' DRM—Janus DRM Technology Debuts in WMP 10 Beta," Winplanet, retrieved Feb. 24, 2005, from http://www.winplanet.com/article/2367-.htm, 2 pages.

Rohde, L., "Gateway sends digital tunes directly to your PC—PC Maker and Pressplay Team for Gateway Music Vault, Which Offers 2,000 Songs Preloaded on Your Hard Drive," PC World, Dec. 6, 2002, retrieved Feb. 17, 2006, from http://www.pcworld.com/news/article/0,aid,107735,00.asp, 3 pages.

Viksnins, R., "Napster 2.0," CNET Reviews, retrieved Feb. 24, 2005, from http://reviews.cnet.com/Napster_2_0/4514-9240_7-30974729.html, 4 pages.

Wiseman, T., "The Current Consumer Obsession With a New Generation of Personal Entertainment and Communication Devices Is Causing Airlines to Rethink Their IFE Strategies," Ultimate Ears, Nov. 2004, retrieved Feb. 24, 2005, from http://www.ultimateears.com/press_aircraft_interiors.htm, 4 pages.

Worthington, D., "Microsoft Remakes DRM for MSN Music Service," BetaNews, Mar. 29, 2004, retrieved Feb. 24, 2005, from http://www.betanews.com/article/1080606040, 26 pages.

Zhang, K., et al., "FluidMedia: An Offline Peer-to-Peer Media Transaction System," HP Laboratories Palo Alto, HPL-2002-342, Dec. 11, 2002, 7 pages.

"Digital Rights Management", Wikipedia, Retrieved Nov. 9, 2006, from http://www.answers.com/topic/digital-rights-management-1, 16 pages.

"Special Topic 1; Thoroughly Comparing PC Purchase Sites," Nikkei Personal Computing, No. 373, Nov. 13, 2000, pp. 126-147.

* cited by examiner

PERSONALIZED PRELOADING OF DIGITAL CONTENT

CROSS REFERENCE TO RELATED APPLICATIONS

This application claims the benefit of provisional U.S. Patent Application No. 60/658,937, filed Mar. 4, 2005 and entitled "Personalized Preloading Of Digital Content," which is hereby incorporated by reference in its entirety.

TECHNICAL FIELD

The following disclosure relates generally to loading of digital media content on devices that play or otherwise present such digital media, such as to preload such devices with content specific to recipients before providing the devices to those recipients.

BACKGROUND

The Internet comprises a vast number of computers and computer networks that are interconnected through communication links, with information being exchanged using various services such as electronic mail, FTP, Gopher, and the World Wide Web (also referred to as the "Web"). In addition to merely providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information).

After receiving an order for one or more items, a Web merchant then fulfills the order by providing the ordered items to the indicated recipient. Some product items may be available to be delivered electronically to a recipient (e.g., music downloaded over the Internet), while other product items (e.g., paperback books) may instead be delivered through physical distribution channels (e.g., shipment via a governmental postal service or private common carrier). Similarly, some service items may be provided electronically (e.g., providing email service), while others may be provided physically (e.g., performing cleaning services at the purchaser's house). The order fulfillment process typically used by Web merchants for product items that are to be physically provided shares similarities with other item ordering services that ship ordered items (e.g., catalog-based shopping, such as from mail-order companies), such as to deliver ordered items from one or more physical distribution or fulfillment centers operated by or on behalf of the Web merchant.

One area of commerce of increasing popularity involves providing various types of content to consumers in digital form, with the digital content then able to be used by the consumers on consumer devices that provide corresponding capabilities. For example, consumers are increasingly purchasing portable digital music player devices on which the consumers can store digital music (e.g., MP3 song files) and then later play it back—such player devices may store the digital music in flash memory and/or on a local hard disk, with some such player devices able to store thousands of music files. Digital music files are typically loaded onto such digital music player devices by consumers using a companion personal computer (e.g., via a physical cable between the player device and the personal computer) that has access to such files, such as by copying the music from a music CD loaded in an appropriate drive of the computer and/or by having downloaded the music files from one or more online music services (e.g., Napster.com, Apple Computer's iTunes, RealNetworks' RealPlayer Music Store, etc.). For some fee-based online music services, each music file may be individually purchased for a specified fee and then played by the consumer as desired (e.g., on the computer to which the file was downloaded or on other portable player devices, and without restrictions on the number of times or the amount of time for which the music file may be accessed). For other fee-based online music services, a consumer may access music files using a subscription to the music service that allows the consumer to download and use an unlimited number of music files, but with the music files usable only under specified conditions, such as only while the subscription continues to be valid, and in some situations only on specified types of devices that allow the continued subscription validity to be verified (e.g., devices using Microsoft Corporation's Janus Windows Media DRM ("Digital Rights Management") 10 technology). In a similar manner, consumers may load and use various other types of non-executable digital media (e.g., videos, photos and other images, e-books and other textual information, etc.) on corresponding digital media player devices (e.g., digital photo display devices, digital video player devices, e-book reader devices, etc.).

Although consumers' ability to load and use various types of digital media on various types of consumer devices provides a variety of benefits, various problems exist. One such problem results from the difficulties faced by consumers in loading appropriate content on their digital media player devices, such as due to the content loading process being extremely time-consuming. For example, when downloading content from an online service to be loaded onto a consumer device, the consumer typically must first manually identify digital media items of interest, wait for the digital media items to be downloaded to a networked computer, and then wait while the digital media items are transferred to a player device. For digital music, for example, this downloading process can take many hours when downloading thousands of music files, even with a high-speed broadband network connection and high-speed connection between the computer and player device, and downloading a video file is typically even more time-consuming than downloading a music or other audio file. Moreover, the process of manually loading hundreds of CDs into one or more computer drives and then copying music files from the CDs will typically take even longer than downloading the music, and manually copying video files from DVDs would similarly be a labor-intensive and time-consuming process. Accordingly, it would be beneficial to provide capabilities to assist consumers in more easily obtaining appropriate digital media that is loaded on their consumer devices, as well as other described capabilities.

DETAILED DESCRIPTION

Techniques are described related to providing consumers with devices on which digital content appropriate for those consumers has been loaded, such as digital media player devices or other consumer devices that are able to play or otherwise present digital media loaded on those devices. In some embodiments, when a consumer orders such a digital media player or other consumer device from a merchant (or other distributor of the device), the merchant preloads a copy of the device with digital media content before delivering that device to the consumer or other specified recipient. Moreover, in some embodiments the digital media items to be preloaded on the device are automatically selected in a personalized manner for the recipient to whom the device will be sent, such as based on information available to the merchant regarding the recipient.

The automatic selection of digital media items that are appropriate for a user may be performed in various ways in various embodiments. As discussed in greater detail below, in some embodiments a merchant may have various information about digital media items that have previously been indicated to be of interest to a user, and if so may automatically identify those items and/or may automatically determine other related items in various ways. By automatically identifying such items of interest for a specified user and/or related items to such items, a personalized set of digital media items may be automatically selected for each user. Moreover, when a consumer device is automatically preloaded with such a personalized set of digital media items for a user before being provided to the user, it enables immediate use of the consumer device by the user when it is received, as well as minimizing or eliminating the need of the user to engage in the lengthy process of identifying and loading appropriate content on the device.

Information about digital media items of interest to a specified target user may be obtained by a merchant or other entity in various ways, such as based on prior shopping-related activities with the merchant (e.g., based on the user having previously purchased or otherwise selected those items of interest for himself/herself and/or for others, such as by having an existing subscription to those items; based on others having purchased or otherwise selected those items for the user; etc.) and/or based on the user having otherwise indicated interest in those items. Such other indications of interest by a user in one or more items may take various forms in various embodiments, such as by the user having explicitly specified to the merchant that those items are of interest (e.g., by interactively designating them and/or by uploading a file that contains a list of them); by the user having searched for and/or browsed those items; by the user having reviewed detailed information about those items; by the user having requested additional information regarding those items; by the user having placed those items on a list indicating an interest in or desire for those items, such as on a wish list or gift registry; by the user having those items as part of a collection stored in a digital locker or other storage mechanism; by the user having placed those items in a virtual shopping cart; by the user having provided a rating for those items, a review of those items, or otherwise provided feedback or information related to those items; by the user having played or otherwise used those items, such as recently or at any time; by the user having discussed those items in a blog or included those items in a user-created list; by relationships of those items to other information specified by the user, such as by those items being alternative versions of items indicated by the user (e.g., a live version of a studio-recorded song or album, a director's cut version of a previously released movie, etc.) and/or such as those items having been specified by or otherwise associated with another user or a group in whom the user has specified an interest (e.g., some or all items specified by another user who reviews items or otherwise selects items of interest, such as for a job of that other user; some or all items selected by one or more peer users, such as to duplicate a playlist or digital library made by peer users who are on a buddy or friends list of the user; some or all items endorsed by an organization or community group to which the user belongs or by a trusted ratings group; etc.); etc.

In addition, in some embodiments digital media items of likely interest to a target user may be automatically identified in other manners, such as based on information related to the user that is obtained from external sources (e.g., information about interactions by the user with other merchants or other entities, such as affiliated entities), or such as based on demographic and/or geographic information about the user and/or on preferences previously specified by the user. Moreover, in some embodiments other digital media items may additionally be automatically identified for a target user in other ways, such as items designated by others (e.g., items being specially promoted by the merchant, or items whose inclusion on the consumer device has been purchased by a party associated with the item, such as a provider or distributor of the item), whether designated for all users or for a group of one or more users that includes the target user (e.g., based on demographic information for the target user).

After items that are of interest to a target user are identified, other items that are related to those items of interest may be automatically determined in various ways, such as to identify items that are similar to those items of interest (e.g., for digital songs of interest, similar items may include other digital songs from the same album, by the same artist, from the same label, in the same genre, from the same time period, having the same quality rating, etc.), to identify items that are different representations of those items of interest (e.g., for a song of interest, a mobile phone ringtone of that song and/or or a music video of that song), and/or to identify items that are otherwise associated with those items of interest, such as based on other users (e.g., items of interest to other users who are similar to or otherwise associated with the target user, or other items that have been selected by other users who have also selected those items of interest, whether for any such other users or for other users that have been selected, such as based on similarities to the target user). More generally, a variety of techniques are available to generate item recommendations for a user based on a set of items of interest and optionally various other information about the user and/or other users, and in some embodiments any such recommendation techniques may be used as part of automatically determining other related items. Techniques for generating item recommendations are also discussed generally in co-pending U.S. patent application Ser. No. 09/528,087, filed Mar. 17, 2000, which is hereby incorporated by reference.

After a personalized set of digital media items has been automatically selected for a target user, those digital media items may in some embodiments be automatically preloaded on a consumer device for the user without approval by the user of those items. Alternatively, in some embodiments in which a consumer has ordered a consumer device for a specified recipient (whether the consumer himself/herself or for another user), such automatically selected digital media items for the specified recipient may be presented or otherwise provided for human approval before being preloaded on the consumer device, such as to the consumer and/or to the specified recipient. In some such embodiments, the human(s) may merely choose to accept or refuse the preloading of those selected digital media items (whether with or without being notified of some or all of the specific items), while in other such embodiments the human(s) may instead be allowed to view and modify the personalized set of digital media items, such as to add and/or remove digital media items (or categories or groups of items). Moreover, in some embodiments any additional information specified by the human(s) may be further used to refine the personalized set of digital media items in an automated manner, such as to determine new related items and/or recommendations based on any modifications initiated by the human(s). After any such human-initiated modifications and any resulting changes have been made, the resulting personalized set of digital media items is then preloaded to the device.

The digital media items or other digital content items to be loaded on corresponding devices may take a variety of forms in various embodiments, including digital music, digital audio books, and other audio in various formats (e.g., MP3 files, WMA (or "Windows Media Audio") files, RealAudio files, AAC (or "Advanced Audio Coding") files, FLAC (or "Free Lossless Audio Codec") files, Ogg Vorbis files, etc.); digital photos and other images in various formats; digital video in various formats (e.g., MPEG-1, MPEG-2, MPEG-4, WMV (or "Windows Media Video"), RealVideo, H.263, H.264, H.26L, etc.); e-books and other textual information in various formats; etc. Moreover, in some embodiments various DRM formats and technology may be used in conjunction with the digital content, such as Microsoft Corporation's Janus Windows Media DRM 10 technology, Apple Computer's FairPlay DRM, RealNetworks' Helix DRM and Harmony technology, etc.

Similarly, the consumer devices on which the digital media or other digital content may be loaded may take a variety of forms in various embodiments, including portable and stationary digital music player devices (e.g., Apple Computer's iPod, Rio MP3 players, Neuros MP3 digital audio recorders, etc.), digital photo display and/or video player devices (e.g., Apple Computer's iPod photo device, portable media center devices from Archos and Samsung, etc.), e-book reader devices, personal computers (e.g., desktops, laptops, tablet PCs, home media center PCs, etc.), various other types of devices having capabilities to play or otherwise present the digital content (e.g., portable and other video game devices, such as Sony's PlayStation and portable PSP devices, Nintendo's GameCube and portable DS and Game Boy Advance devices, and Microsoft's Xbox device; PDAs and other handheld devices; cell phones; smart phones; VOIP phones; digital cameras and camcorders; etc.), television set-top boxes, personal/digital video recorders (e.g., TiVo devices), etc. More generally, any device for use by an individual, group, organization or other entity that has storage for digital content, with the stored digital content able to be played or otherwise used on the device or another connected device, may in some embodiments be preloaded with appropriate digital content for the individual, group, organization or other entity. In addition, in some embodiments the devices on which the digital content is loaded are devices that are designed and/or configured to support appropriate DRM or other access controls related to the media, such as DRM or access controls that support subscription-based usage restrictions for the digital content (e.g., Microsoft Corporation's Janus Windows Media DRM 10 technology). Moreover, in some embodiments the digital content may instead be loaded on digital content transport articles to be read and used by appropriate devices (e.g., when a customer purchases or otherwise selects such an article), such as flash memory media (e.g., USB-based memory keys, memory sticks, and digital memory cards), portable hard disk-based media, PCMCIA cards, DAT, CDs, DVDs, etc, and then sent to the specified recipient for use with an appropriate device.

For illustrative purposes, some embodiments are described below in which the disclosed techniques are used to preload digital music content on digital music player devices, and in which appropriate music is selected for a target recipient of a device in various specified ways. However, those skilled in the art will appreciate that the techniques of the invention can be used in a wide variety of other situations, including with other types of non-executable digital media, with various types of executable digital content, and with various other types of digital devices, as well as with other techniques for selecting and loading digital content, and that the invention is thus not limited to the specific illustrative details that are discussed.

Figure 1:
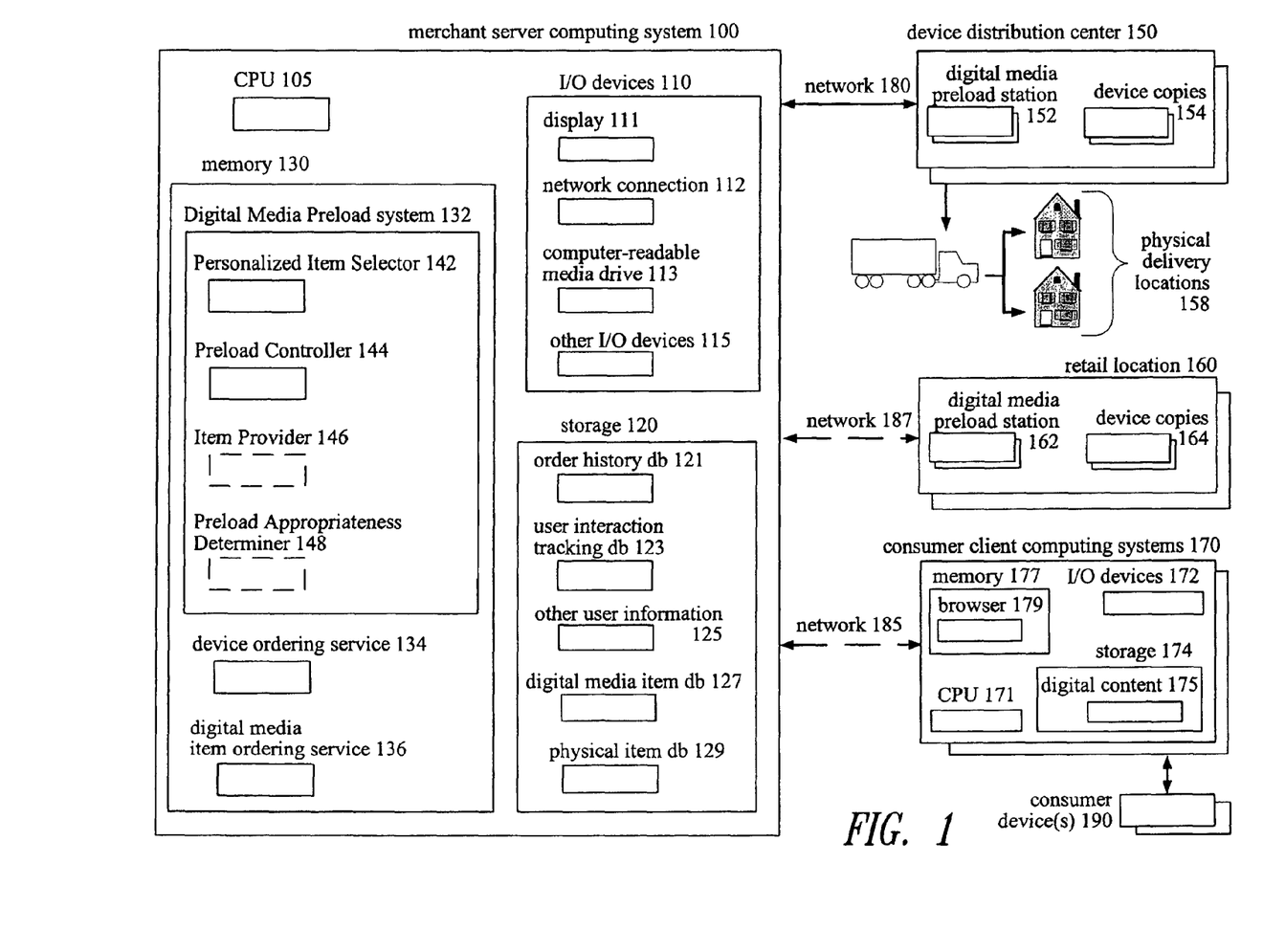
FIG. 1 is a block diagram illustrating an embodiment of a system for facilitating the preloading of consumer devices with personalized digital media specific to recipients before providing the devices to those recipients.

In some embodiments, the described techniques for preloading digital music content on digital music player devices in a manner personalized to the device recipients are utilized by a merchant or other distributor of digital media player devices that also provides digital music to consumers, such as part of an online music download service hosted by the merchant or by another entity affiliated with the merchant. FIG. 1 illustrates an example embodiment of one or more computing systems used by such a merchant to provide at least some of the described techniques, as discussed in greater detail below.

In addition, in some embodiments the described techniques for preloading digital music content on digital music player devices in a manner personalized to the device recipients are provided in conjunction with an online music service that provides subscription-based access to music such that a subscriber can use a large or unlimited number of music files while the subscription is valid. For example, in some embodiments the described preloading of digital music files may be performed for customers (or other specified recipients of a digital music player device) who already have a subscription to an online music service accessible by the merchant (e.g., a music service provided by the merchant), and/or for customers who are currently purchasing a package or other combination of items that includes a digital music player device and such a subscription.

In other embodiments, the described techniques for preloading digital music content on digital music player devices in a manner personalized to the device recipients may be provided in situations in which a recipient of a digital music player device does not have a subscription to a music service, such as when the digital music files and/or digital music player device support DRM or other access controls that allow access to the preloaded digital music content only under specified conditions. For example, a digital music player device could be automatically preloaded with personalized digital music for a target recipient, and the recipient could then be prompted or queried when using the device to purchase access to the preloaded content (e.g., via a multi-item subscription and/or per-item use licenses) and/or to satisfy any other specified access conditions. Alternatively, the recipient could be allowed limited access to preloaded digital music items for free (e.g., to listen to a digital music item only a specified number of times, or to listen to only a specified number of digital music items), with additional access requiring a subscription or other payment. In addition, regardless of whether a digital media player device supports DRM or other access controls, digital media items may be preloaded on the device in other circumstances, such as when some or all of the items are available for free (thus allowing access to such items without restrictions) and/or when a user has previously purchased access to those items (e.g., has purchased individual licenses for each item, such as to allow unlimited use and/or use under specified conditions) or concurrently purchases such item access at the time of device acquisition.

In some embodiments, at least some of the preloaded digital music items may further be modified versions of available digital music items, such as to provide partial samples or other excerpts of some digital music items and/or to provide other types of promotional material related to digital music items. In such embodiments, the user may be allowed to access such modified versions under specified conditions (e.g., for a maximum number of times, or in an unrestricted manner), but may need to acquire a subscription or make other payment in order to obtain full access to the digital music items. Alternatively, even in situations in which the user has a subscription, such modified items may be provided for other reasons (e.g., to save space on the digital music player device, or to provide digital music items that were not automatically selected as being appropriate for the user, such as to expose the user to additional types of music and/or to include items being promoted). In at least some such embodiments, capabilities may be provided to allow a user to indicate that a full version of such a modified item is of interest (e.g., while the user is listening to the modified item, such as by selecting an appropriate control on the digital music player device), and if so the indicated full version item of interest may be automatically downloaded to the digital music player device when possible (e.g., when the digital music player device is next docked or otherwise in communication with a networked computer or other device that has access to the indicated full version item). In other embodiments, the preloaded digital music items may instead not be modified, but DRM controls or other access controls may provide similar functionality by limiting access to only portions of the digital music items.

In some embodiments, at least some of the described techniques may instead be used in other situations and manners. For example, the described techniques for automatically selecting digital media items that are appropriate for a target user may be used in situations other than with respect to preloading the items on a device, such as the following: to provide recommendations to a user of an online music service for digital music items to interactively select for download (e.g., in response to a single-action user selection to provide such recommendations, such as by using a user-selectable control displayed on a Web page presented to the user); to identify digital media items to download to an appropriate device that is already in the possession of a user, such as to automatically push such selected digital media items to the device for later use by the user (e.g., in situations in which the user has a subscription); and to load digital media items on devices at times other than before an initial distribution of the device to a recipient, such as when the device has been returned for repairs or when the device is available at a designated digital media item physical downloading facility (e.g., docked in a kiosk at a physical store or other location associated with the music service, or otherwise networked or connected to such a physical facility, such as in a wireless networked manner). In addition, in some embodiments the described techniques are used to preload digital media items on a device that are appropriate for a group of users, such as a group of users who will use the device (whether simultaneously or serially), and such as based on the intersection and/or the union of appropriate digital media items for individual members of the group. Furthermore, in some embodiments the described techniques are used to preload digital media items that are appropriate for a target user on a group of multiple devices, such as a group of devices to be used simultaneously or serially by the user, and such as to replicate the appropriate digital media items on each of multiple of the devices (e.g., on all of the devices) or instead to distribute the digital media items across the devices in such a manner that each item is stored on only one device.

FIG. 1 illustrates an example embodiment of a server computing system 100 suitable for use by a merchant in executing an embodiment of a Personalized Digital Media Preload system, as well as one or more consumer client computing systems 170 from which users can make requests to the server computing system. The computing system 100 includes a CPU 105, various input/output ("I/O") devices 110, storage 120, and memory 130. The I/O devices include a display 111, a network connection 112, a computer-readable media drive 1 13, and other I/O devices 115.

In the illustrated embodiment, the merchant uses the server computing system to provide an online ordering service (e.g., a Web store) via which customers can order consumer devices, as well as in the illustrated embodiment to optionally order a variety of other types of physical items for delivery, with an interface 134 for the online ordering service executing in memory 130 in this illustrated embodiment. In particular, some customers may interact with the ordering service interface 134 to obtain information about available items, such as from a physical item database 129 on storage 120, and may then place orders via the interface for such items to be physically delivered to specified recipients. Such customers may interact with the ordering service interface 134 in various ways, such as by using browser applications 179 executing in memory 177 of consumer client computing systems 170 and/or by using other client computing devices (not shown). After a customer places an order for one or more such items, the ordering service provides order information to one or more distribution centers 150 that are affiliated with the merchant so that those distribution centers can physically provide the ordered items to the specified recipient, and further stores information about the order in an order history database 121 on storage.

In the illustrated embodiment, the merchant also uses the server computing system to provide an online digital media item ordering service (e.g., a digital music store) from which customers can order and download digital media items, with an interface 136 for the digital media ordering service executing in memory 130 in this illustrated embodiment. In other embodiments, different computing systems of the merchant may instead be used to provide the physical item and digital media item ordering services, or the merchant may instead provide at most one of those services and have affiliations with one or more other entities who provide one or more instances of those services. In this embodiment, customers may interact with the ordering service interface 136 to obtain information about available digital media items, such as from a digital media item database 127 on storage 120, and may then select such items via the interface for download (e.g., for a fee and/or in conjunction with a subscription of the user), such as to be stored as digital content 175 on storage 174 of a client computing system 170 of the customer, and then optionally transferred to one or more connected consumer devices 190. Such customers may interact with the ordering service interface 136 in various ways, such as by using browser applications 179, by using specialized application software (not shown) for the digital media service, and/or by using other client computing devices (not shown).

The physical item and/or digital media item ordering services may also track and use various information about users and about user interactions with the merchant. For example, after a customer places an order for one or more physical items and/or downloads or otherwise selects one or more digital media items, the corresponding ordering service may store information about those items in an order history database ("db") 121 on storage 120, although in other embodiments the two ordering services may instead maintain separate history databases. Similarly, one or both of the physical item and digital media item ordering services may further track and store information about various other types of interactions with the ordering services in a user interaction tracking db 123 on storage, such as to track searches for items, selections of items, usage patterns of items (e.g., based on information obtained from the client computing systems and/or consumer devices), etc. One or both of the physical item and digital media item ordering services may also track and store various other types of information about users in a user information db 125 on storage, such as to track information about user subscriptions with the digital media ordering service, user accounts with one or both of the ordering services, user preference information, user demographic information, etc. In other embodiments, the various types of information may instead be stored in other ways (e.g., to track information from the device or other physical item ordering service separately from information from the digital media item ordering service), and various other types of information may additionally be stored.

An embodiment of the Personalized Digital Media Preload system 132 is also executing in memory 130 of the server computing system 100 in this illustrated embodiment, although in other embodiments different computing systems of the merchant may instead be used to provide the preload system 132 and one or both of the physical item and digital media item ordering services (e.g., by having embodiments of the preload system 132 instead execute at one or more of the device distribution centers), or the preload system 132 may instead be incorporated as part of the physical item ordering service. In the illustrated embodiment, when the physical item ordering service receives an order for a consumer device of one or more specified types, the ordering service provides information about the order to the preload system 132 for processing. In this example, an optional Preload Appropriateness Determiner component 148 of the preload system then determines whether it is appropriate to preload the ordered consumer device with personalized digital media that is specific for the recipient of the consumer device (e.g., based on information about the order and/or from one or more of the databases 121-125), such as to determine to perform the preloading for any recipient and/or any consumer device able to load the digital media, for recipients that already have and/or concurrently are receiving a subscription to the digital media ordering service, for consumer devices that provide sufficient DRM-related capabilities, for recipients that provide approval for the preload, etc. In other embodiments, such appropriateness determination may instead not be performed, such as if all consumer devices for all users are to be preloaded with such personalized digital media.

If it is determined to automatically perform such preloading, a Personalized Item Selector component 142 of the preload system then automatically selects one or more appropriate personalized digital media items for the recipient (e.g., sufficient items to fill the consumer device to a specified level or threshold, such as to completely fill the device), such as based on information about the recipient and/or other users from one or more of the databases 121-129—the preload system may further in some embodiments interact with the user who placed the order and/or the recipient so as to obtain interactive authorization or other approval to perform the preloading and/or to obtain information regarding digital media items to preload. When the automatic selection of the one or more appropriate personalized digital media items for the recipient has been completed (e.g., after receiving any interactive user feedback and revising the automatically selected items based on the feedback), a Preload Controller component 144 of the preload system then provides information regarding the automatically selected items to one or more computing systems (not shown) at the distribution center from which the consumer device is to be distributed in such a manner as to initiate or otherwise schedule the preloading of the selected items, although in other embodiments the computing system 100 may instead itself perform the preloading of the consumer device (e.g., when the computing system 100 is acting as or in conjunction with a local digital media preload station, not shown).

When such an order for a consumer device to be preloaded with appropriate personalized digital media items for a recipient is to be fulfilled at one of the distribution centers, a copy 154 of the consumer device is retrieved for shipment processing (whether manually or in an automated manner). Before completing the preparation of a package to ship the consumer device copy (or other preparation for providing the consumer device to the recipient), however, the consumer device copy is connected (whether with a physical cable/dock or in a wireless manner) to a digital media preload station 152 at the distribution center. The preload station obtains the information about the appropriate personalized digital media items for the consumer device from a computing system at the distribution center, obtains copies of those digital media items (e.g., by downloading them from the digital media database 127, whether directly or by interacting with an optional Item Provider component 146 of the preload system; by retrieving them from a local database of digital media items (not shown); by receiving them from the preload system 132 as part of the information provided for the ordered consumer device, such as from the Preload Controller component and/or the Item Provider component; etc.), and then loads those items onto the consumer device copy (e.g., in a high-speed manner). The consumer device copy is then shipped to the physical delivery location 159 of the recipient in a typical manner, although in some embodiments various types of expedited delivery and/or specialized delivery processing may instead be used (e.g., to perform immediate and/or a prioritized packaging of the device copy and/or to perform next-day or same-day delivery, such as to allow use of the loaded device by the recipient as quickly as possible).

In addition, in some embodiments the preload system 132 and/or digital media item ordering system may further automatically provide appropriate digital content to some or all users (e.g., users having subscriptions to the digital media item ordering system) in other manners, such as to automatically select appropriate digital media items for a target user and to automatically download those items to a client computing system 170 of that target user, which can then be transferred to a connected consumer device 190. Moreover, in some situations downloads of items may be performed in other situations, such as to download a full copy of an item after the user has approved or otherwise selected a modified preloaded copy of that item (e.g., a sample or other excerpt of a music file).

FIG. 1 further illustrates an alternative embodiment in which the Digital Media Preload system facilitates preloading of devices at one or more physical retail locations 160

(e.g., electronics stores operated by other merchants, or a physical retail store operated by the merchant providing the device ordering service), such as in conjunction with the operators of those retail locations. In particular, in such embodiments a retail location may stock copies 164 of various consumer devices, and may further have one or more digital media preload stations 162 at the retail location. In such embodiments, when a consumer purchases or otherwise selects an appropriate consumer device, the Digital Media Preload system may interact with one or more computing systems (not shown) at the retail location in a manner similar to that previously described in order to facilitate preloading of the consumer device with appropriate digital media before the consumer device is provided to the consumer. In particular, after being provided with information regarding the consumer or other recipient, the Digital Media Preload system may operate as previously described to identify personalized digital media items specific to that consumer or other recipient (as well as to optionally determine whether it is appropriate to preload the device with such personalized digital media), and to provide information about those items to a computing system at the retail location. Information about the consumer or other recipient may be identified and provided to the Digital Media Preload system in various ways (e.g., based on information explicitly provided by the consumer, based on a credit or debit card used by the consumer to purchase the device, based on information from the operator of the retail location that is associated with a loyalty card used by the consumer, etc.).

After the information about the personalized digital media items is provided to the retail location, the actual loading of the digital media items onto the consumer device copy may be performed in various ways in various embodiments. For example, a representative of the retail location (e.g., an employee) may connect the consumer device copy to a preload station at the retail location, which then obtains the information about the appropriate personalized digital media items, obtains copies of those digital media items (e.g., by downloading them from the digital media database 127, from a local database of digital media items (not shown), by receiving them from the preload system 132 as part of the provided information, etc.), and then loads those items onto the consumer device copy (e.g., in a high-speed manner)—in this manner, the consumer may be presented with a preloaded device at the retail location. Alternatively, in some embodiments the consumer may himself/herself be able to perform at least some of the activities for loading the device with appropriate digital media items at the retail location, such as if the preload station is publicly accessible to and usable by the consumer (e.g., a kiosk at the retail location). Such customer-activated preloading may be performed by the customer after the customer has purchased or otherwise acquired the consumer device (e.g., while the customer remains in the retail location after the acquisition, or instead at a later time after the customer has left and returned), or instead prior to such an acquisition. Moreover, in at least some embodiments, the consumer may further be allowed to provide interactive feedback regarding digital media items to be downloaded in manners similar to those previously discussed, whether the loading of the device is performed by the consumer or by a representative of the retail location.

Those skilled in the art will appreciate that computing systems/devices 100, 170 and 190 are merely illustrative and are not intended to limit the scope of the present invention. Computing system 100 may instead be comprised of multiple interacting computing systems or devices, and may be connected to other devices that are not illustrated, including through one or more networks such as via the Internet and/or the World Wide Web ("Web"), via cellular data networks (e.g. networks based on GSM, GPRS, EDGE, W-CDMA, UMTS, HSDPA CDMA2000, 1xRTT, 1xEVDO, etc.), and via other wireless data networks (e.g. Wi-Fi, WiMAX, etc.). More generally, a "client" or "server" computing system or device may comprise any combination of hardware or software that can interact in the manners described and perform the described techniques, including (without limitation) desktop or other computers, network devices, PDAs, cellphones, cordless phones, devices with walkie-talkie and other push-to-talk capabilities, pagers, electronic organizers, Internet appliances, television-based systems (e.g., using set-top boxes and/or personal/digital video recorders), and various other consumer products that include appropriate inter-communication and computing capabilities. In addition, the functionality provided by the illustrated systems may in some embodiments be combined in fewer systems or distributed in additional systems, and one or more of the systems may each have multiple components that each provides a portion of the functionality of that system. Similarly, in some embodiments the functionality of some of the illustrated systems may not be provided and/or other additional functionality may be available.

Those skilled in the art will also appreciate that, while various elements are illustrated as being stored in memory or on storage while being used, these elements or portions of them can be transferred between memory and other storage devices for purposes of memory management and data integrity. Alternatively, in other embodiments some or all of the software systems (or portions of them) may execute in memory on another device and communicate with the illustrated computing system via inter-computer communication. Some or all of the systems and/or data structures (e.g., portions of a database, such as one or more tables or views or portions thereof) used by the systems may also be stored (e.g., as software instructions or structured data) on a computer-readable medium, such as a hard disk, a memory, a computer network or cellular wireless network or other transmission medium, or a portable media article (e.g., a DVD or flash memory device) to be read by an appropriate drive or via an appropriate connection. Some or all of the systems and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 2:
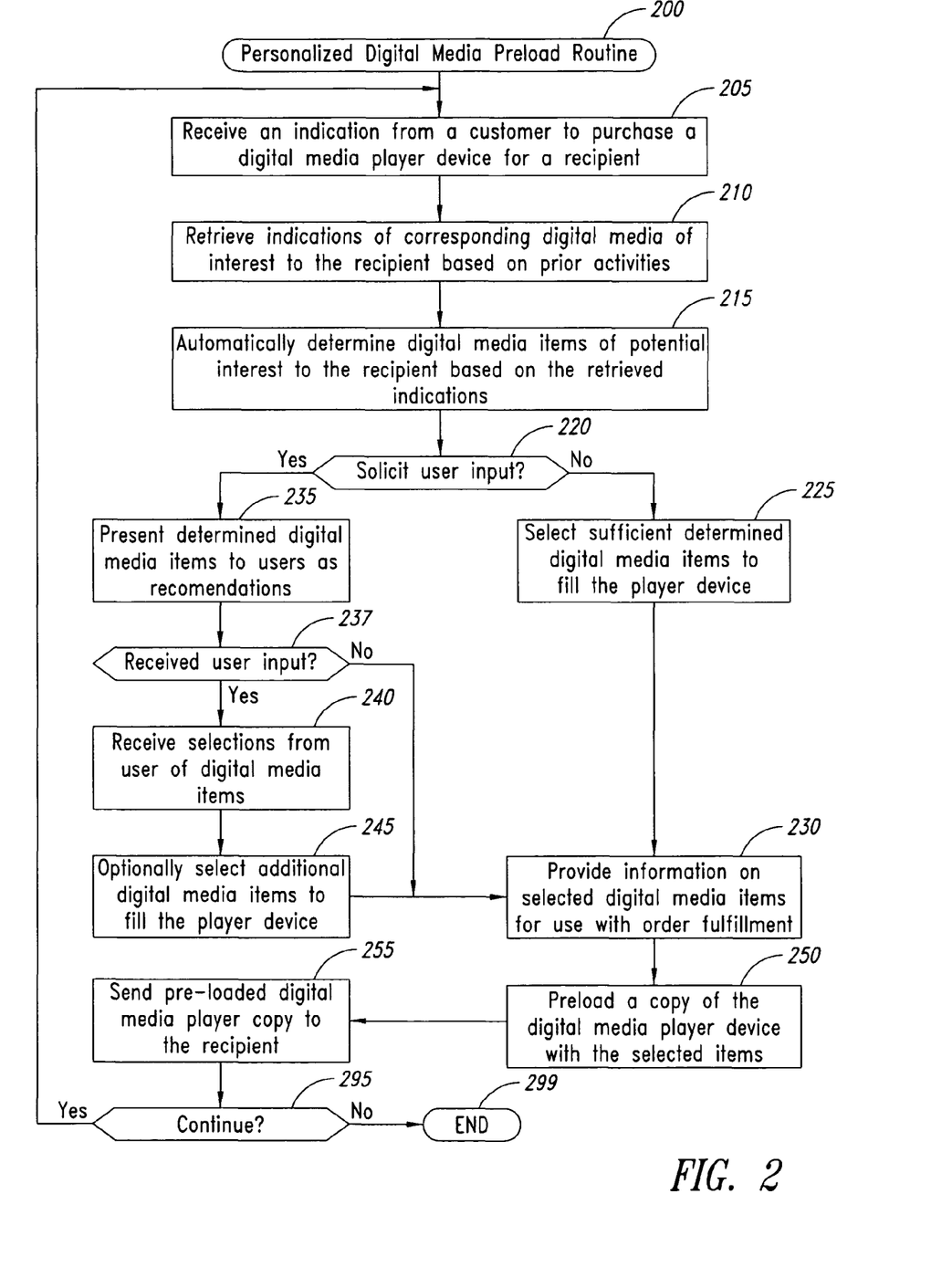
FIG. 2 is a flow diagram of an example embodiment of a Personalized Digital Media Preload routine.

FIG. 2 is a flow diagram of an example embodiment of a Personalized Digital Media Preload routine 200. The routine may, for example, be provided by execution of an embodiment of the Personalized Digital Media Preload system 132 of FIG. 1, such as to in this illustrated embodiment preload a digital media player device with digital media items that are automatically selected as being appropriate for a recipient before providing the loaded player to the recipient. In some embodiments, the routine may be provided only under specified conditions, such as for certain types of digital media player devices and/or for certain types of customers and/or recipients, and the routine may further in some embodiments be provided by or associated with one or more online digital media item download services (e.g., services that support subscription-based access to at least some of the digital media items that they make available for download).

The routine begins at step 205, where an indication is received that a customer has indicated to purchase a digital media player device for a specified recipient (e.g., the customer), although in other embodiments other types of devices may be selected, a device may be selected for other types of provision to a recipient (e.g., for rental, loan, evaluation, etc.), and/or the routine may be performed in other situations (e.g., before the customer has decided to purchase or otherwise select the device, such as to provide information about appropriate digital media items that can be preloaded on a device while the customer is considering purchasing the device).

The routine then continues to step 210 to retrieve indications of digital media items that are likely to be or known to be of interest to the recipient, and in step 215 proceeds to automatically select additional digital media items based on the indicated digital media items that will potentially be of interest to the recipient.

The indicated digital media items that are likely to be or known to be of interest to the recipient may be selected in various ways, such as based on previous purchasing and/or downloading activities related to those digital media items, and the automatic selecting of the additional digital media items may similarly be performed in various ways (e.g., to select similar items to the indicated items, to select items that are associated with the indicated items based on prior activities of the recipient and/or other users, etc.). The digital media items automatically identified in steps 210 and 215 are then available as candidates for the personalized digital media items for the recipient.

The routine then continues to step 220 to determine whether to solicit user input to possibly modify the group of personalized digital media item candidates, although in other embodiments such user input soliciting may always be performed or may instead never be performed. In the illustrated embodiment, if user input is not to be solicited (e.g., based on preference information for the recipient and/or consumer, based on an inability to currently obtain such user input, etc.), the routine continues to step 225 to select some or all of the personalized digital media item candidates as the personalized digital media items to be used for the preloading, such as to select sufficient items to fill the player device to a desired level or degree (e.g., substantially completely full).

If it was instead determined in step 220 to solicit user input, the routine continues instead to step 235 to present information about some or all of the personalized digital media item candidates (or about other types of related information, such as factors used to select these items, or such as commonalities among some or all of these items, such as categories, genres, artists, etc.) to one or more users (e.g., the consumer), such as for use as recommendations of the personalized digital media items to be preloaded on the player device. If it is determined in step 237 that user input regarding the personalized digital media item candidates is received, selections are obtained from the user(s) in step 240 to identify the personalized digital media items to be used for the preloading, such as by modifying the presented group of personalized digital media item candidates (e.g., user selections of media item candidates to include and/or to exclude, of additional media items to include, of media items to use when automatically determining other similar or otherwise related items, etc.). In step 245, other digital media items are optionally automatically selected as personalized digital media items to be used for the preloading based on the user input received in step 240, such as to replace other personalized digital media item candidates that were previously automatically selected and/or to supplement such other previously selected digital media item candidates (e.g., to obtain sufficient digital media items to fill the player device to a desired level or degree).

After steps 225 or 245, or if it was instead determined in step 237 that no user input was received, the routine continues to step 230 to provide information about the current group of personalized digital media items for use in preloading the player device as part of fulfillment of the order for the player device, such as information to a human representative of a merchant or other distributor of the player device for use in the preloading and/or to an automated station or other system that will perform the preloading. In step 250, the preloading is then performed on a copy of the player device using the provided information, with the preloading performed in some embodiments in such a manner as to provide DRM protection or other access controls for some or all of the preloaded digital media items. In step 255, the player device copy with the preloaded digital media items is then provided to the indicated recipient. In step 295 it is determined whether to continue. If so, the routine returns to step 205, and if not continues to step 299 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

While not illustrated here, various interfaces (e.g., GUIs, or "graphical user interfaces") may be used to interact with customers and/or recipients in various ways, such as to present one or more Web pages to users interacting with an online retailer or with a computer-assisted kiosk. In addition, as previously noted, a variety of types of information and capabilities may be provided to users via such interfaces, such as the ability to approve whether to preload a consumer device, to review a list of items to be preloaded, to review a list of items to be preloaded and provide approval, to modify a list of items to be preloaded, to otherwise provide input regarding items of interest to the user, etc. Moreover, in at least some embodiments users may be presented with information about personalized items at times other than during or after purchase of an appropriate consumer device, such as to provide such information to a user as an incentive to perform such a device purchase or instead to provide such information to users for other purposes.

From the foregoing it will be appreciated that, although specific embodiments have been described herein for purposes of illustration, various modifications may be made without deviating from the spirit and scope of the invention.

Accordingly, the invention is not limited except as by the appended claims and the elements recited therein. In addition, while certain aspects have been discussed in specific terms such as to be described as processes and/or systems and/or are presented below in certain claim forms,, the inventors contemplate the various aspects of the invention in any available claim form, including methods, systems, computer-readable mediums on which are stored executable instructions or other contents to cause a method to be performed and/or on which are stored one or more data structures, computer-readable generated data signals transmitted over a transmission medium and on which such executable instructions and/or data structures have been encoded, etc.

What is claimed is:

1. A computer-implemented method for automatically preloading digital music player devices that are ordered by customers with personalized groups of digital music files before providing the digital music player devices to the customers, the method comprising:
   for each of multiple customers of an online retailer,
      receiving an order from the customer for a subscription to an online digital music service, the subscription allowing the customer to download and play back digital music files from the online digital music service while the subscription remains valid;
      receiving an order from the customer for a digital music player device;
      before shipping a copy of the digital music player device to the customer, automatically loading the digital music player device copy with a group of digital music files from the online digital music service that is personalized to the customer, the automatic loading of the digital music player device copy being performed by one or more configured computing systems of the online retailer, the automatic loading of the digital music player device copy including,
         retrieving information about indicated songs in which the customer has previously expressed an interest and automatically determining additional songs that are potentially of interest to the customer, the determining being performed by at least one of the one or more configured computing systems and including selecting songs that are automatically recommended for the customer; and
         after the digital music player device copy is connected to a preload station, loading digital music files from the online digital music service on the digital music player device copy for each of the indicated songs and each of the additional songs; and
      fulfilling the order for the digital music player device by shipping the digital music player device copy that is loaded with the digital music files to the customer.

2. The method of claim 1 wherein the online retailer has one or more distribution centers from which ordered physical items are shipped to customers, and wherein the loading of each of the digital music player device copies is performed after an employee at one of the distribution centers connects the digital music player device copy to a preload station at that distribution center.

3. The method of claim 1 including automatically generating the song recommendations for each of the customers by analyzing information regarding prior interactions between the online retailer and the customer and by using information regarding prior selections of songs by other customers.

4. The method of claim 1 wherein the online digital music service uses Digital Rights Management ("DRM") technology restrictions for digital music files to enforce customer subscriptions, wherein at least some of the digital music files loaded on each of the digital music player device copies are files whose use by customers is regulated by DRM restrictions, and wherein each of the digital music player devices is a device that provides support for the DRM restrictions on digital music files.

5. The method of claim 1 wherein the automatic loading of each digital music player device copy with a group of digital music files personalized to a customer includes obtaining approval from the customer to perform the loading.

6. The method of claim 1 wherein the automatic loading of each digital music player device copy with a group of digital music files personalized to a customer includes, before the loading of the digital music files on the digital music player device copy, presenting to the customer information about the automatically determined additional songs for the customer and modifying the additional songs based on input received from the customer.

7. The method of claim 1 including, for each of at least some of the customers and after the shipping of a digital music player device copy to the customer, downloading additional digital music files from the online digital music service to the digital music player device copy while the subscription of the customer with the online digital music service remains valid.

8. The method of claim 1 wherein the online retailer offers to customers a package that includes a subscription to the online digital music service and a digital music player device that supports the subscription to the online digital music service, and wherein the orders received from each of at least some of the customers for a subscription and for a digital music player device are based on an order for the offered package.

9. The method of claim 1 wherein the automatic loading of each digital music player device copy with a group of digital music files personalized to a customer is performed in such a manner as to fill the digital music player device copy with digital music files.

10. A computer-readable medium whose contents include software instructions that when executed configure a computing device to preload consumer devices with digital content for the recipients, by performing a method comprising:
   determining to provide a consumer device to a recipient;
      under control of the configured computing device, automatically determining one or more digital content items that are appropriate for the recipient, the determining such that each of at least some of the digital content items have not been specified by the recipient;
      storing the determined digital content items on the consumer device in such a manner that the stored digital content items will be accessible for use by the recipient; and
   providing the consumer device to the recipient.

11. The computer-readable medium of claim 10 wherein the automatic determining of the one or more digital content items that are appropriate for the recipient further includes automatically determining whether it is appropriate to store digital content items on the consumer device.

12. The computer-readable medium of claim 11 wherein the automatic determining of whether it is appropriate to store digital content items on the consumer device is based at least in part on whether the recipient has a subscription for the digital content items.

13. The computer-readable medium of claim 10 wherein the storing of the determined digital content items on the consumer device is performed without obtaining approval of the recipient.

14. The computer-readable medium of claim 10 wherein the automatic determining of the one or more digital content items that are appropriate for the recipient further includes selecting items that are automatically recommended for the recipient.

15. The computer-readable medium of claim 10 wherein the method is performed on behalf of a retailer, wherein the consumer device is a digital music player device being acquired from the retailer for the recipient, and wherein at least some of the digital content items are digital music items provided by the retailer.

16. The computer-readable medium of claim 10 wherein the computer-readable medium is a memory of a computing device.

17. The computer-readable medium of claim 10 wherein the determining to provide the consumer device to the recipient is based at least in part on a purchase order received for the consumer device for delivery to the recipient.

18. A computing system configured to preload digital media articles intended for recipients with digital media items personalized to the recipients, comprising:
one or more processors:
a personalized item selector component that is configured to, when executed by at least one of the one or more processors, automatically determine one or more digital media items for a recipient in a manner specific to the recipient, at least one of the determined diuital media items having not been previously specified by the recipient; and
a preload controller component that is configured to, when executed by at least one of the one or more processors, store the determined digital media items on a digital media article to be provided to the recipient, so that the recipient can access the stored digital media items for presentation.

19. The computing system of claim 18 further comprising a third component that is configured to provide the digital media article with the stored digital media items to the recipient.

20. The computing system of claim 18 wherein the digital media article is a digital media player device.

21. The computing system of claim 20 wherein the digital media player device is a digital music player device being acquired for the recipient, and wherein at least some of the determined digital media items are digital music items for play back to the recipient.

22. The computing system of claim 18 wherein the digital media article is a digital media transport article.

23. The computing system of claim 18 wherein the automatic determining of the one or more digital media items for the recipient includes selecting at least some digital media items that are from automatically generated recommendations for the recipient.

24. The computing system of claim 18 further comprising a physical item ordering service from which the digital media article is ordered for the recipient and a digital media item ordering service from which the determined digital media items are acquired.

25. The computing system of claim 18 wherein the computing system operates on behalf of an online retailer, and wherein the preload controller component is part of a preload station at a distribution facility of the online retailer.

26. The computing system of claim 18 wherein the computing system operates on behalf of a retailer, and wherein the preload controller component is part of a preload station at a physical retail store of the retailer.

27. The computing system of claim 18 wherein the computing system is part of a preload station accessible for use by consumers at a publicly accessible location.

28. The computing system of claim 18 wherein the preload controller component operates to store the determined digital media items on the digital media article after the recipient acquires the digital media article and provides the acquired digital media article to an operator of the computing system.

29. The computing device of claim 18 wherein the personalized item selector component and the preload controller component each include software instructions for execution by the one or more processors of the computing system.

30. The computing system of claim 29 wherein the computing system further comprises a memory in which the software instructions of the personalized item selector component and the preload controller component are loaded, and a connection configured to send information to the digital media article.

* * * * *

UNITED STATES PATENT AND TRADEMARK OFFICE
CERTIFICATE OF CORRECTION

| | | |
|---|---|---|
| PATENT NO. | : 8,370,216 B2 | Page 1 of 1 |
| APPLICATION NO. | : 11/113449 | |
| DATED | : February 5, 2013 | |
| INVENTOR(S) | : Steven Kessel et al. | |

It is certified that error appears in the above-identified patent and that said Letters Patent is hereby corrected as shown below:

In the Claims:

Column 17, Line 27:
"recipient, at least one of the determined diuital media" should read, --recipient, at least one of the determined digital media--.

Signed and Sealed this
Tenth Day of September, 2013

Teresa Stanek Rea
*Acting Director of the United States Patent and Trademark Office*